US012489264B2

(12) United States Patent
Scaglione et al.

(10) Patent No.: US 12,489,264 B2
(45) Date of Patent: Dec. 2, 2025

(54) ROTATIONAL CABLE CONNECTOR AND DISCONNECTOR TOOL

(71) Applicant: INTERNATIONAL BUSINESS MACHINES CORPORATION, Armonk, NY (US)

(72) Inventors: Joseph Scaglione, Poughkeepsie, NY (US); Paul Samaniego, Port Ewen, NY (US); Oswald J. Mantilla, Wappingers Falls, NY (US); Daniel Ruiz, Cold Spring, NY (US); Mateusz Koziol, Poughkeepsie, NY (US); Michael T. Peets, Staatsburg, NY (US); Kyle Olson, Lagrangeville, NY (US); Timothy Gordon, Saugerties, NY (US); Brianna Malcolm, Hyde Park, NY (US)

(73) Assignee: International Business Machines Corporation, Armonk, NY (US)

( * ) Notice: Subject to any disclaimer, the term of this patent is extended or adjusted under 35 U.S.C. 154(b) by 415 days.

(21) Appl. No.: 18/340,914

(22) Filed: Jun. 26, 2023

(65) Prior Publication Data

US 2024/0429669 A1 Dec. 26, 2024

(51) Int. Cl.

*H01R 43/26* (2006.01)
*H01R 13/621* (2006.01)
*H01R 13/639* (2006.01)

(52) U.S. Cl.

CPC ......... *H01R 43/26* (2013.01); *H01R 13/6215* (2013.01); *H01R 13/639* (2013.01)

(58) Field of Classification Search

CPC ...................................................... H01R 43/26
See application file for complete search history.

(56) References Cited

U.S. PATENT DOCUMENTS 3,043,446 A * 7/1962 Beers ..................... H01R 43/26 414/787
3,397,880 A 8/1968 Kuban
4,821,392 A * 4/1989 Layland, Jr. ........... H01R 43/26 439/160
5,104,335 A 4/1992 Conley et al.
(Continued)

FOREIGN PATENT DOCUMENTS

EP 2396586 B1 1/2019

*Primary Examiner* — Neil Abrams
(74) *Attorney, Agent, or Firm* — Anthony Curro

(57) ABSTRACT

A tool to facilitate attachment and detachment of cable connectors. The tool includes a backstop plate for engaging a cable connector receptacle housing, an overmold plate for engaging a cable connector being insertibly connected into a cable connector receptacle, and a rotational means passing through a rotational acceptor formed as part of the overmold plate and rotatably attached to the backstop plate. The rotational means causes the overmold plate to approach the backstop plate upon application of a first spin direction of the rotational means and causing the overmold plate to recede from the backstop plate upon application of a second spin direction of the rotational means. The overmold plate approaching the backstop plate causes the engaged cable connector to be insertibly connected into the cable connector receptacle housing and the overmold plate receding from the backstop plate causes the engaged cable connector to be removed.

20 Claims, 4 Drawing Sheets

(56) References Cited

U.S. PATENT DOCUMENTS

| | | | | |
|---|---|---|---|---|
| 6,979,220 | B1 | 12/2005 | Ray et al. | |
| 7,377,028 | B2 * | 5/2008 | Hasircoglu | H01R 43/26<br>29/757 |
| 7,470,141 | B2 | 12/2008 | Yoest | |
| 8,152,554 | B2 | 4/2012 | Chapel et al. | |
| 8,757,894 | B2 | 6/2014 | Katoh | |
| 9,865,957 | B2 | 1/2018 | Makwinski | |
| 9,958,621 | B2 | 5/2018 | Wong et al. | |
| 10,396,512 | B2 | 8/2019 | Gniadek | |
| 10,446,949 | B2 | 10/2019 | Ehret et al. | |
| 12,341,309 | B2 * | 6/2025 | Hatch | H01R 13/635 |
| 2012/0100732 | A1 | 4/2012 | Liang | |
| 2014/0315414 | A1 | 10/2014 | Gao | |
| 2017/0338590 | A1 | 11/2017 | Haller | |
| 2018/0309235 | A1 | 10/2018 | Pemwieser | |
| 2019/0341724 | A1 | 11/2019 | Utz et al. | |

* cited by examiner

ROTATIONAL CABLE CONNECTOR AND DISCONNECTOR TOOL

FIELD OF THE INVENTION

The present invention relates generally to hand tools and more particularly to a tool to assist in connecting and disconnecting cable connectors in a crowded place.

BACKGROUND

Many people who work in the IT field are familiar with the typical mess of cables presented inside of a network hub, switch, server rack, or any complex electrical assembly where a large number of cables and cable connectors are in a congested space. In case someone needs to connect or disconnect a cable in these spaces, the large number of cables in the space may make it difficult or impossible to insert or remove one cable connector inside of a tight space crowded with other cable connectors. It may be physically impossible to, for example, reach one cable connector surrounded by other cable connectors, and disconnecting a number of other cable connectors in order to make space may cause, for example, downtime for the computer network or other issues. Cable routing often becomes the most time-intensive step in the configuration of complex electrical assemblies.

A need presents itself for a tool to facilitate connecting and disconnecting cable connections in an easy, safe, and effective manner.

SUMMARY

Embodiments of the present invention disclose a tool to facilitate attachment and detachment of cable connectors. The tool includes, in an embodiment of the invention, a backstop plate, an overmold plate, and a rotational means. The backstop plate engages a cable connector receptacle housing. The overmold plate engages a cable connector and attached cable being insertibly connected into a cable connector receptacle formed as part of the cable connector receptacle housing. The rotational means passes through the rotational acceptor formed as part of the overmold plate and is rotatably attached to the backstop plate. The rotational means causes the overmold plate to approach the backstop plate upon application of a first spin direction of the rotational means and causes the overmold plate to recede from the backstop plate upon application of a second spin direction of the rotational means. The second spin direction is opposite of the first spin direction. The overmold plate approaching the backstop plate causes the engaged cable connector to be insertibly connected into the cable connector receptacle housing and wherein the overmold plate receding from the backstop plate causes the engaged cable connector to be removed from the cable connector receptacle housing.

In further embodiments of the invention, the rotational means is associated with a torque limiter, the torque limiter limiting a rotation of the rotational means beyond a rotational limit and thereby preventing the overmold plate from approaching the backstop plate beyond a safety limit to prevent an excessive force from being applied by the overmold plate to the cable connector being insertibly connected into the cable connector receptacle, while allowing a positive engagement between the cable connector and the cable connector receptacle.

DETAILED DESCRIPTION

Figure 1:
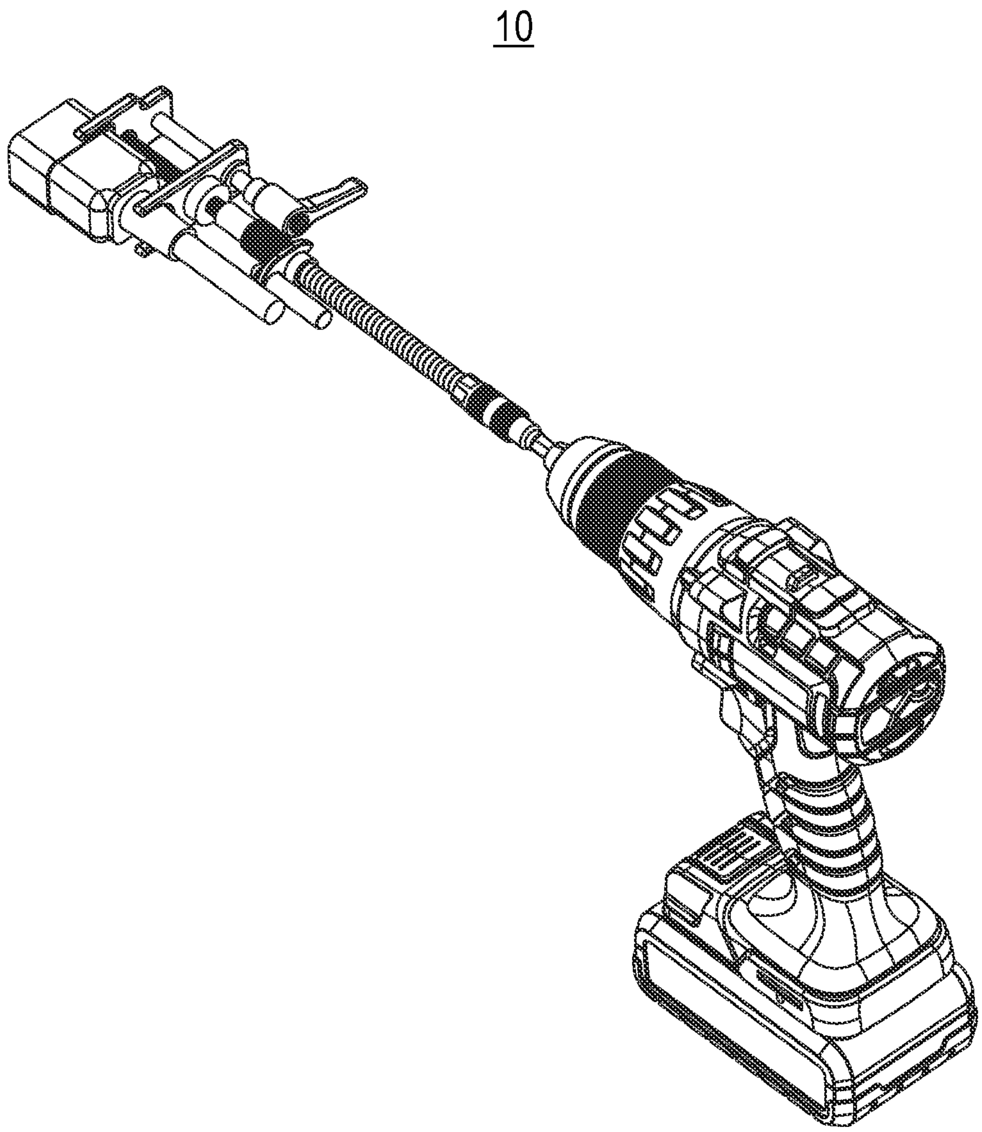
FIG. 1 is a perspective view of a representative cable connector and disconnector tool, in accordance with an embodiment of the present invention.
Figure 2:
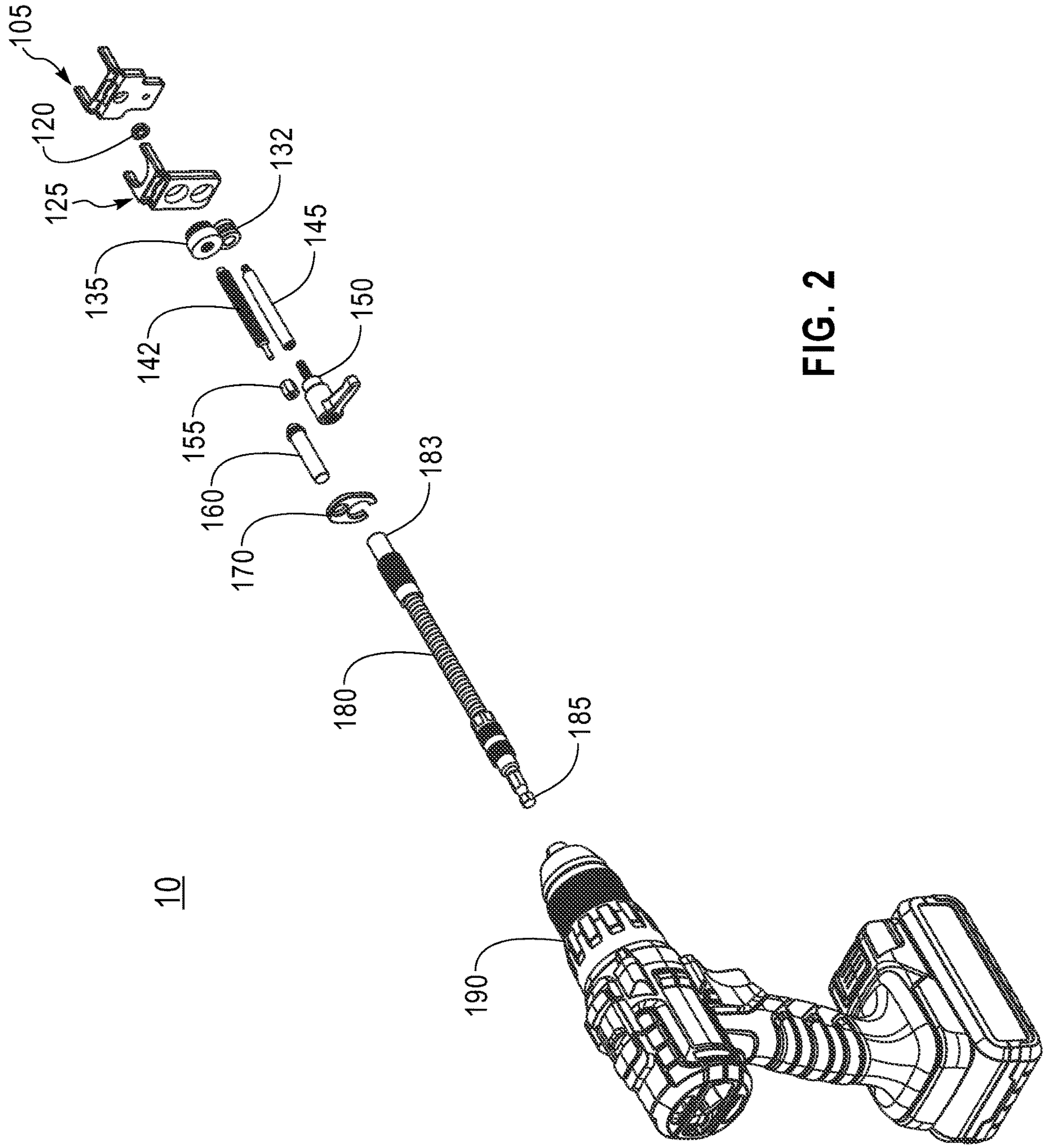
FIG. 2 is a perspective view of components of the representative cable connector and disconnector tool of FIG. 1, in accordance with an embodiment of the present invention.
Figure 4:
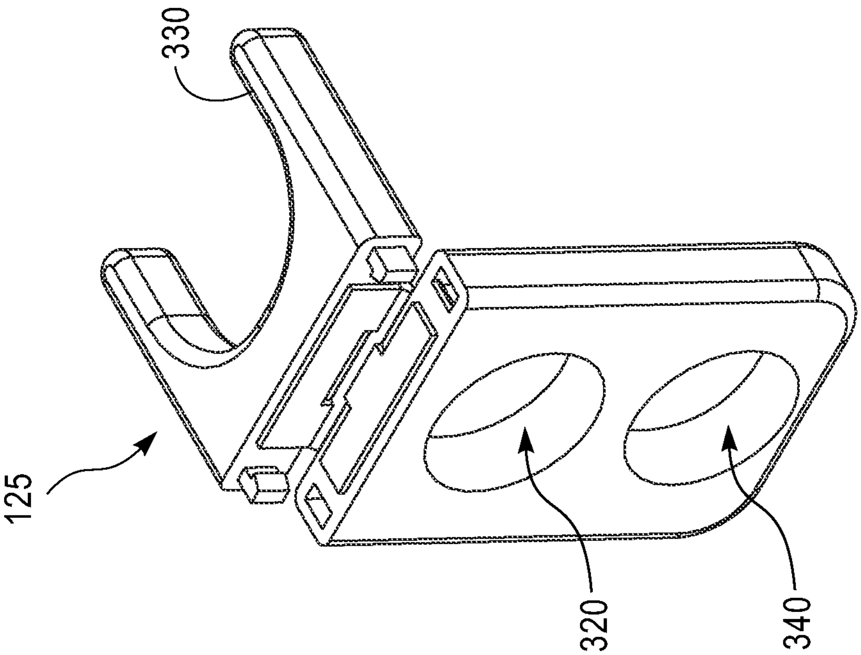
FIG. 4 is a perspective view of an overmold plate of the representative cable connector and disconnector tool of FIG. 1, in accordance with an embodiment of the present invention.
Figure 3:
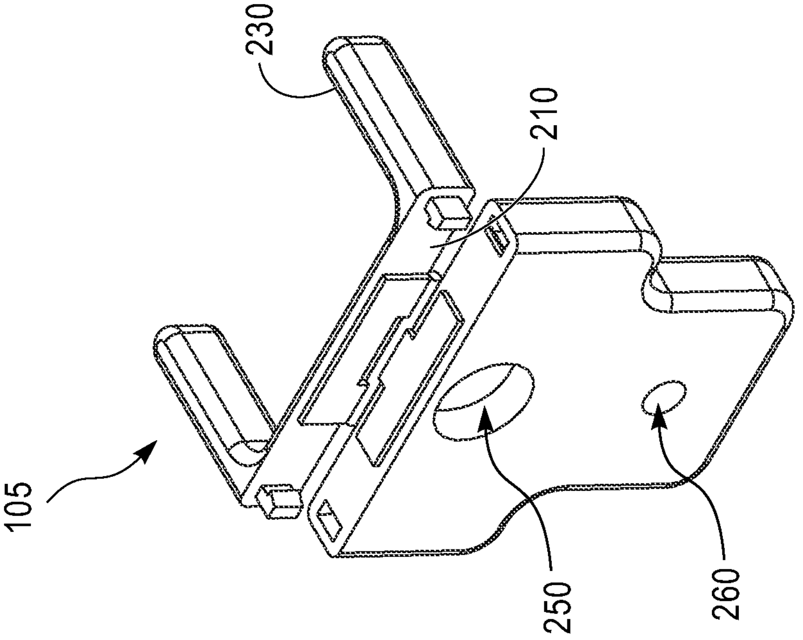
FIG. 3 is a perspective view of a backstop plate of the representative cable connector and disconnector tool of FIG. 1, in accordance with an embodiment of the present invention.
Figure 5:
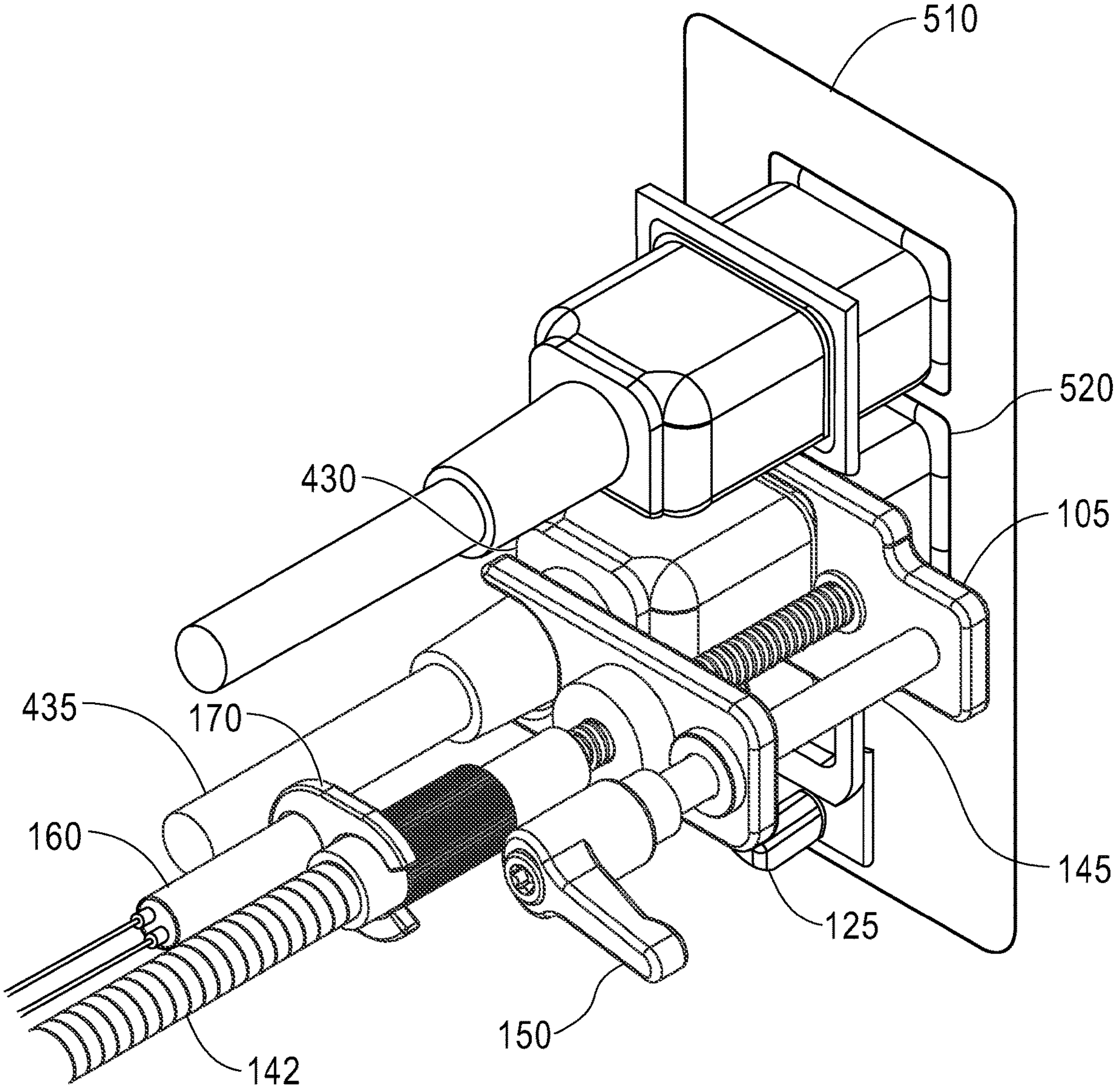
FIG. 5 is a perspective view of the cable connector and disconnector tool of FIG. 1 engaging a cable connector and attached cable being insertibly connected into a cable connector receptacle formed as part of the cable connector receptacle housing.

Referring now to the drawings for a better understanding of the present invention, a representative cable connector and disconnector tool for attaching and detaching cable connectors in a crowded space is displayed in FIG. 1 et seq. by reference number 10. As displayed in FIG. 1 et seq., cable connector and disconnector tool 10 is comprised, in various embodiments of the invention, of a number of individual parts including a backstop plate 105 for engaging a cable connector receptacle housing 510, an overmold plate 125 for engaging a cable connector 430 and attached cable 435 being insertibly connected into a cable connector receptacle 520 formed as part of the cable connector receptacle housing 510, and a rotational means 142 passing through a rotational acceptor 320 formed as part of the overmold plate 125 (such as a lead screw nut 135 attached to overmold plate 125) and rotatably attached to the backstop plate 105 (such as via a ball bearing 120 in ball bearing housing). The rotational means 142 causes the overmold plate 125 to approach the backstop plate 105 upon application of a first spin direction of the rotational means 142 and causes the overmold plate 125 to recede from the backstop plate upon application of a second spin direction of the rotational means 142. The second spin direction is opposite of the first spin direction. The overmold plate 125 approaching the backstop plate 105 causes the engaged cable connector 430 to be insertibly connected into the cable connector receptacle 520. The overmold plate 125 receding from the backstop plate causes the engaged cable connector 430 to be removed from the cable connector receptacle housing 520 when a user reverses rotation.

Overmold plate 125 engages the cable connector 430 via an aperature 320 formed as part of the overmold plate 125. Attached cable 435 passes through aperature 320. The diameter of attached cable 435 is less than the diameter of aperature 320, allowing free movement along the length of cable 435, while a diameter of cable connector 430 is larger than diameter of aperature 320, allowing aperature 320 and overmold plate 125 to engage and connect with cable connector 430 to provide for manipulation of the cable connector 430 into the cable connector receptacle 520, as discussed. In order to place attached cable 435 into aperature 320, a user can thread an opposite end of attached cable 435 with a smaller cable connector (not shown) through aperature, or simply thread a bare wire through aperature 320. In alternative embodiments of the invention, aperature 320 is associated with a locking hinge (not shown) allowing "clipping" of cable 435 into place, or an equivalent means.

Cable connector and disconnector tool 10 may be utilized in connection with different types of cable connectors 430, in various embodiments of the invention. Many types of cable connectors 430 may take advantage of embodiments of the invention, as many types of network hubs, server racks, or other complex electrical assemblies can present to an information technology specialist, for example, a large number of electrical cable connectors 430 in a crowded, small space. Cable connector 430 in various embodiments may be any one of a C13 PDU connector, a C10 PDU connector, an RJ45 connector, a straight tip connector, a subscriber connector, or any other which would benefit from embodiments of the present invention. Cable connector receptacle housing 510 and cable connector receptacle 520 are of a type to accept a type of cable connector 430 being attached (and cable connector receptacle housing 510 is of a type to provide for engagement with backstop plate 105, such as by portions of backstop plate 105 grasping edges of cable connector receptacle housing 510). Cable connector 430 may, in alternative embodiments of the invention, be for home electrical, automotive, or industry applications, as all such applications may benefit from presently disclosed embodiments. The automotive repair industry, for example, may present situations where it is very difficult to connect a portion of a wiring harness to a sensor in a location where a person cannot reach. Safety benefits may be presented as well. Cable connector 430 may be of a high-voltage variety, where a large amount of danger may be presented to a human who was directly contacting a high-voltage cable connector 430, so instead various insulators available on cable connector and disconnector tool 10 may provide a safety benefit to user when coupling cable connector 430.

In various embodiments of the invention, rotational means 142 is a leadscrew or a threaded rod with threads allowing for conversion between rotational and linear movements. As discussed elsewhere herein, rotation of rotational means 142 in various directions causes overmold plate 125 to approach and recede from backstop plate 105. Rotation of rotational means 142 is provided by a rotational power tool (such as an electrical drill or an electrical screwdriver, displayed by reference number 190) or a hand tool (not displayed, but for example a screwdriver, socket driver, or the like). In embodiments of the invention as displayed in FIG. 1 et seq, rotational power tool 190 or hand tool are not directly connected to rotational means 142, but are rather rotated via a snake bit 180, with a first end of the snake bit 185 attached to rotational power tool 190 and a second end of the snake bit 183 attached to the rotational means 142 (such as via a snake bit adapter 155). In further embodiments, any or all of snake bit 180, portions of rotational power tool 190, and/or portions of hand tools are flexible, allowing a user of cable connector and disconnector tool 10 to flexibly position different portions of tool 10 (along with engaged cable connector 430 and attached cable 435) into a correct position for insertible connection into cable connector receptacle 520 in a crowded or limited space environment where a user's hand could not directly insert a cable connector 430 into a cable connector receptacle 520.

Since cable connector and disconnector tool 10 may be utilized in a tight or low-visibility environment, such as a server rack in a small unlit room, in the recesses of a car engine bay, or elsewhere, cable connector and disconnector tool 10, in various embodiments of the invention may have integrated a torque limiter to automatically prevent an over-rotation of rotational means 142, and to thereby prevent an excessive force from being applied by the overmold plate 125 to the cable connector 430 being insertibly connected into the cable connector receptacle 520. Torque limiter still provides for a positive engagement between cable connector and the cable connector receptacle housing 510 (e.g. allowing for the cable connector 430 to be positively "clicked" into cable connector receptacle 520, which provides for the attached cable 435 to function normally in communicating electricity, data, etc.). In embodiments without torque limiter, a user of tool 10 must be careful not to overtorque rotational means 142, because overtorqueing can lead to cable connector 430 being inserted into cable connector receptacle 520 with too much force, causing breakage of cable connector 430, as well as possibly also breakage of cable connector receptacle 520 and cable connector receptacle housing 510.

In embodiments where torque limiter is present, torque limiter limits a rotation of the rotational means 142 beyond a rotational limit. Torque limiter may be created, in various embodiments, by a rotational resistance of the rotational means 142 (created, by example, by forging of a leadscrew with a degree of elasticity). In alternative embodiments of the invention, torque limiter is created by a series of spring disks associated with tool 10, two or more friction sleeves associated with tool 10, or in any presently existing or after-arising means. In embodiments where torque limiter is created by spring disks or friction sleeves, if torque over a certain limit is applied, the spring disks or friction sleeves will "slip" and not allow more force to be applied (and thereby limit torque being transferred to rotational means 142, etc.).

Cable connector and disconnector tool 10 may have other features, in various embodiments of the invention, that present advantages to a user in a tight, congested, and dark environment. Cable connector and disconnector tool 10 may comprise a light 160 to light the cable connector 430 and the cable connector receptacle housing 510 in a tight, congested, and dark environment. Light 160 allows the user to see, for example, which cable connector receptacle 520 the cable connector 430 is being inserted into. The light 160 may be an LED, incandescent light, or the equivalent. Light 160 is attached to cable connector and disconnector tool 10 via an LED retention clip 170 attached to a second end of flexible snake bit 183.

Overmold plate 125 and backstop plate 105 may also present other features for assistance in using cable connector and disconnector tool 10 in tight spaces. Overmold plate 125 and/or backstop plate 105 may comprise two or more forks 230, 330 attached to a main body of each of overmold plate 125/backstop plate 105 via a pivoting hinge 210, 310. Forks 230, 330 may be held in place by clips that need to be manually latched and unlatched, or in other means (such as by a user squeezing forks 230, 330 from a side). The two or more forks 230, 330, when folded down, allow overmold plate 125 and backstop plate 105 to be compressed and allow for overmold plate 125 and backstop plate 105 to enter into tight spaces where, for example, a large number of cable connector(s) and cables are present, and if overmold plate 125 and backstop plate 105 were not folded down, the overmold plate 125 and backstop plate 105 may not be able to pass through a tight congestion of cables. Two or more forks 230 associated with backstop plate 105, when returned to their non-folded position may assist in engaging the cable connector receptacle housing 510, whereas the two or more forks 330 associated with overmold plate 125 engage the cable connector and attached cable. The forks 230, 330 may attach, for example at 90° to a remainder of overmold plate 125/backstop plate 105 body when un-folded and 45° when folded. In alternative embodiments of the invention, other angle combinations are contemplated which facilitate entry of tool 10 into tight spaces.

A handle 150 may be present on cable connector and disconnector tool 10 to allow user to guide tool 10 in tight spaces. Handle 150 may be attached, for example, to extension 145 to overmold plate 125 (such as via a linear bearing 132, a weld, or in another way in pass-thru 340) and backstop plate 105 (via connection 260). Extension 145 serves, in this embodiment, to both allow handle 150 to sit close enough to rotational power tool 190 to allow a user to manipulate handle 150 to guide tool 10 into a certain space, as well as to prevent a counter-rotation of the overmold plate 125 when the rotational means 190 rotates in the first spin direction and rotates in the second spin direction. In alternative embodiments, other functionality associated with tool 10 will prevent counter-rotation.

Operation of an embodiment of the invention is as follows: a user threads a cable 435 through aperture 250. The user then guides cable connector and disconnector tool 10 via grasping of the rotational power tool 190 and handle 150 such that backstop plate 105 engages cable connector receptacle housing 510. User then, after positioning tool 10, powers rotational power tool 190, causing overmold plate 125 to approach backstop plate 105 and thereby causing the engaged cable connector 430 to be insertibly connected into cable connector receptacle housing 510, until a positive engagement occurs between cable connector 430 and cable connector receptacle 520. A torque limiter (not shown) automatically prevents further rotation of the rotational means. User can then remove tool 10.

Based on the foregoing, a cable connector and disconnector tool 10 has been disclosed. However, numerous modifications and substitutions can be made without deviating from the scope of the present invention. Therefore, the present invention has been disclosed by way of example and not limitation.

What is claimed is:

1. A tool to facilitate attachment and detachment of cable connectors, the tool comprising:

- a backstop plate for engaging a cable connector receptacle housing;
- an overmold plate for engaging a cable connector and attached cable being insertibly connected into a cable connector receptacle formed as part of the cable connector receptacle housing; and
- a rotational means passing through a rotational acceptor formed as part of the overmold plate and rotatably attached to the backstop plate, the rotational means causing the overmold plate to approach the backstop plate upon application of a first spin direction of the rotational means and causing the overmold plate to recede from the backstop plate upon application of a second spin direction of the rotational means, the second spin direction opposite of the first spin direction;
- wherein the overmold plate approaching the backstop plate causes the engaged cable connector to be insertibly connected into the cable connector receptacle and wherein the overmold plate receding from the backstop plate causes the engaged cable connector to be removed from the cable connector receptacle.

2. The tool of claim 1, wherein the rotational means is associated with a torque limiter, the torque limiter limiting a rotation of the rotational means beyond a rotational limit and thereby preventing the overmold plate from approaching the backstop plate beyond a safety limit to prevent an excessive force from being applied by the overmold plate to the cable connector being insertibly connected into the cable connector receptable, while allowing a positive engagement between the cable connector and the cable connector receptacle.

3. The tool of claim 2, wherein the rotational means is associated with a torque limiter limiting torque via selectively one or more of a rotational resistance of the rotational means, a series of spring disks, and two or more friction sleeves.

4. The tool of claim 1, wherein the rotational means is a leadscrew or a threaded rod.

5. The tool of claim 1, wherein the rotational means is attached to a flexible snake bit.

6. The tool of claim 5, wherein the rotational means is rotated by a rotational power tool in connection with a first end of the flexible snake bit and a second end of the flexible snake bit is attached to the rotational means.

7. The tool of claim 6, wherein the rotational power tool is an electric drill or an electric screwdriver.

8. The tool of claim 1, wherein the rotational means is rotated by a hand tool in connection with a first end of the rotational means.

9. The tool of claim 8, wherein the hand tool is a screwdriver or socket driver.

10. The tool of claim 1, further comprising a light for lighting the cable connector and the cable connector receptacle housing.

11. The tool of claim 1, wherein the overmold plate comprises two or more forks for engaging the cable connector and attached cable.

12. The tool of claim 11, wherein the two or more forks are attached to the overmold plate via a pivoting hinge.

13. The tool of claim 1, wherein the backstop plate comprises two or more forks for engaging the cable connector receptacle housing.

14. The tool of claim 13, wherein the two or more forks are attached to the backstop plate via a pivoting hinge.

15. The tool of claim 1, further comprising a handle for a user to guide the tool.

16. The tool of claim 15, wherein the handle is attached via an extension to the overmold plate, the extension preventing a counter-rotation of the overmold plate when the rotational means rotates in the first spin direction and rotates in the second spin direction.

17. The tool of claim 1, wherein the overmold plate engages the cable connector via an aperture formed as part of overmold plate, the attached cable passing through the aperature.

18. The tool of claim 1, wherein the cable connector is selected from a group comprising a C13 PDU connector, a C10 PDU connector, an RJ45 connector, a straight tip connector, and a subscriber connector.

19. The tool of claim 1, wherein the cable connector is a high voltage connector.

20. The tool of claim 1, wherein the rotational acceptor formed as part of the overmold plate is a lead screw nut, the lead screw nut attached to the overmold plate.

* * * * *